Dec. 22, 1936.  A. H. DAVIS, JR  2,065,118
METHOD AND APPARATUS FOR TESTING METALS FOR DEFECTS
Filed Aug. 13, 1932  2 Sheets-Sheet 1
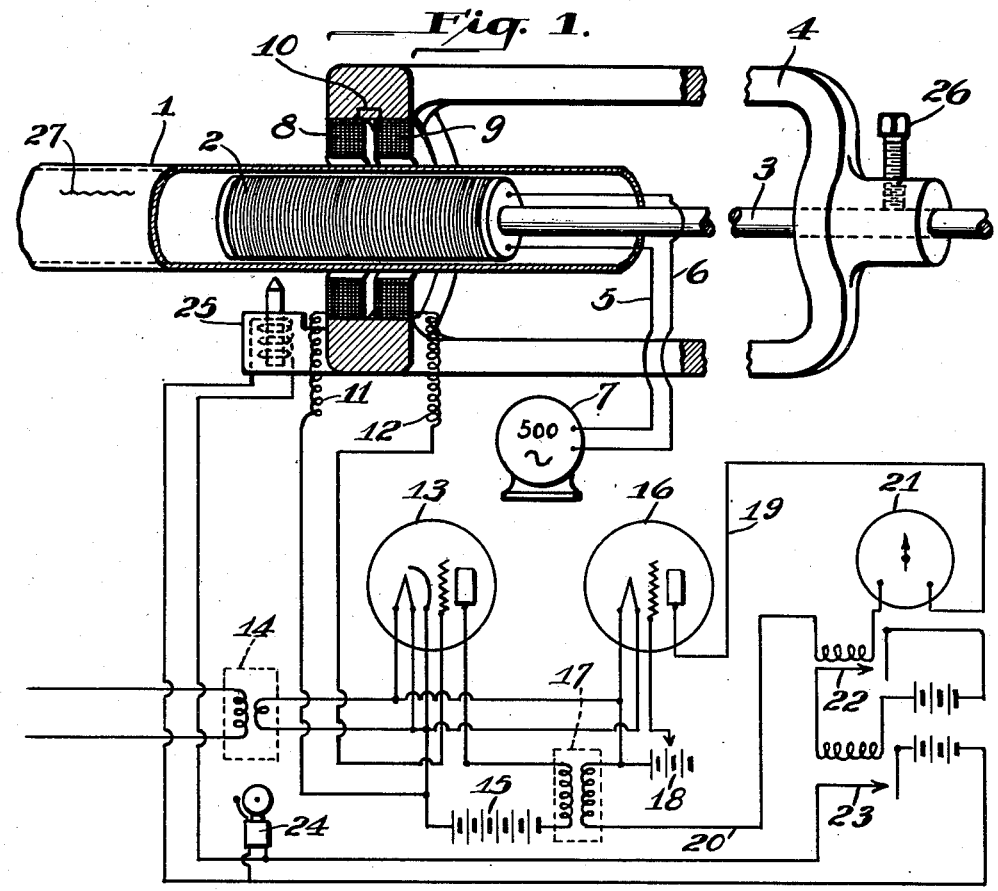
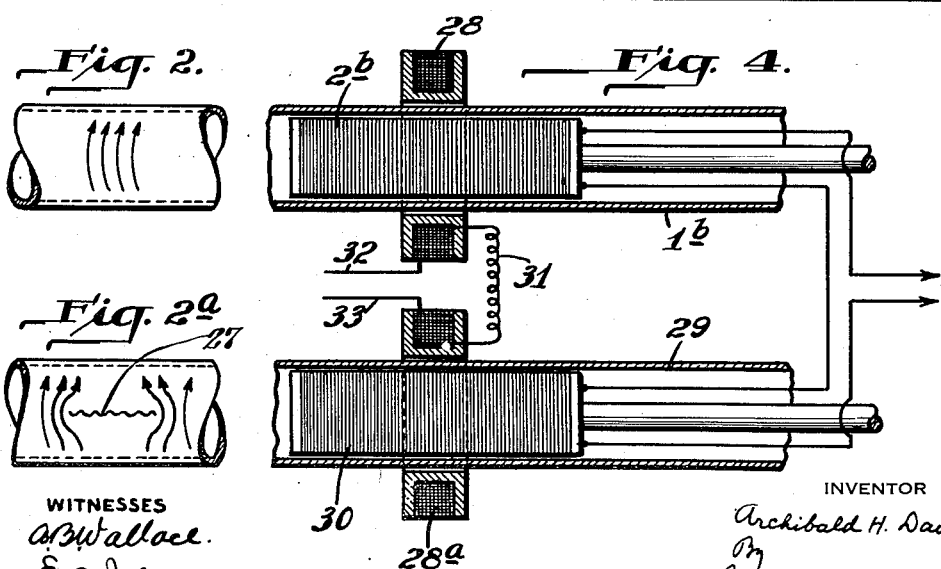
WITNESSES
A. B. Wallace
E. O. Johns
INVENTOR
Archibald H. Davis, Jr.
By Brown, Critchlow & Hick
his Attorneys.

Dec. 22, 1936.  A. H. DAVIS, JR  2,065,118
METHOD AND APPARATUS FOR TESTING METALS FOR DEFECTS
Filed Aug. 13, 1932  2 Sheets-Sheet 2
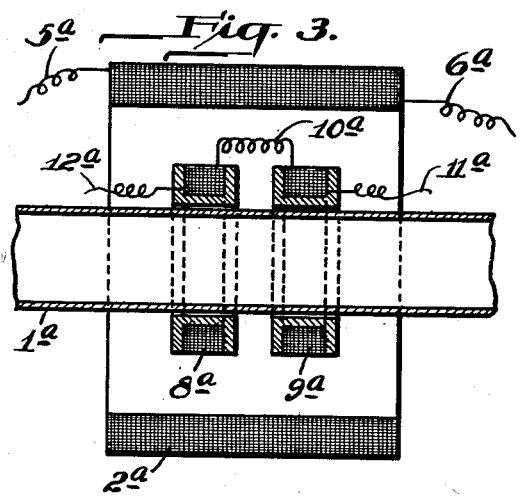
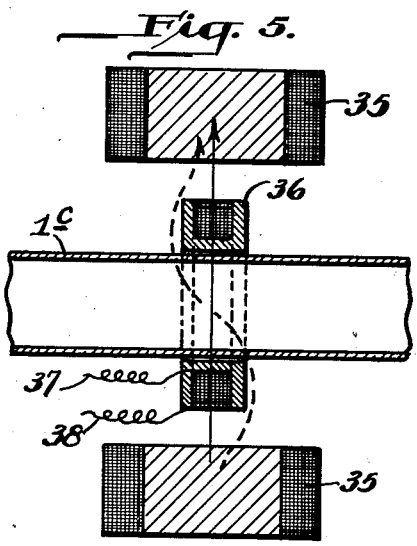
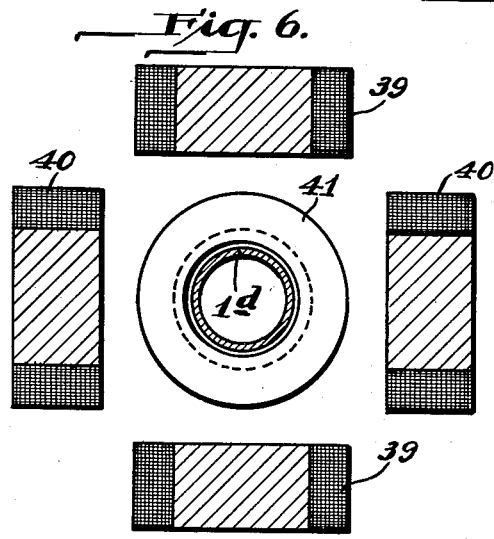
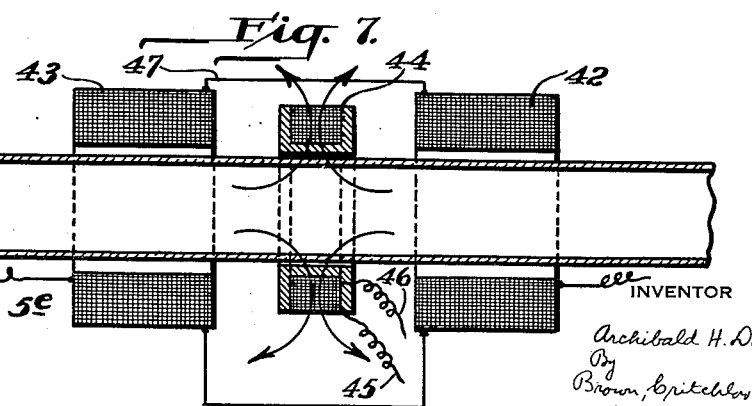

Patented Dec. 22, 1936

2,065,118

UNITED STATES PATENT OFFICE 2,065,118

METHOD AND APPARATUS FOR TESTING METALS FOR DEFECTS

Archibald H. Davis, Jr., New Castle, Pa., assignor, by mesne assignments, to Steel and Tubes, Inc., Cleveland, Ohio, a corporation of Ohio Application August 13, 1932, Serial No. 628,677

9 Claims. (Cl. 175—183)

This invention relates to the testing of metallic articles, especially tubing, to locate defects therein.

In the manufacture of tubing and other metallic articles it is extremely difficult to entirely avoid defects. For instance, the billets from which tubing is drawn commonly contain non-metallic inclusions, such as slag, oxide, dirt, etc. In the drawing operations such material is drawn out longitudinally of the tube and results in elongated non-metallic inclusions which may extend more or less deeply into the wall of the finished tube. Also, fissures may be formed in the tube, as by rupture of the metal, or through the failure of folds to re-weld to the body of the tube in the drawing operation. Also, in the case of alloys segregation and the like may cause non-uniformities in the product.

These and other defects may weaken the tubing to such an extent as to render it unfit for some uses, particularly where it is to be subjected to pressure, either in use or in expanding it by hydrostatic pressure. For instance, such defects may cause the tube to fail under the pressure to which it is subjected. Also, fissures, non-metallic inclusions and similar defects form sources of weakness which are liable to cause fatigue failure if the tubing is subjected to alternating stresses.

It has been proposed to apply magnetic principles to the testing of ferrous metal articles, but these methods may not be adapted to satisfactory commercial practice, either because of lack of sensitivity for detecting minor flaws, or for other reasons. And they can not be applied to testing of non-magnetic material, such as copper, aluminum, and the like, which are especially susceptible to the defects referred to.

Up to the present time no means other than visual inspection of finished tubing formed from copper, aluminum and the like metals and their alloys, has been available for locating such defects. Visual examination, however, is of substantially no use for this purpose. Thus, with tubing formed from metals such as copper and aluminum, the reflecting power of the metal combined with the curvature of the tube makes it extremely difficult to observe any but the very grossest defects in the exterior of the tube. Obviously it is virtually impossible visually to inspect the inner surfaces of long tubes. Moreover, in many instances the defect does not appear at either surface, but lies buried in the metal between the outer and inner surfaces, so that the most careful scrutiny could not disclose it. Despite the greatest care in manufacture it has not been possible to make such articles, for example copper tubing, free from such defects, so that failures and attendant scrap and replacement losses have presented a serious problem. These would be minimized if there were available a suitable mode of locating the defects.

A major object of this invention is to provide a method of testing metallic articles, and particularly tubing, to locate defects of various types in the article, which is simple, rapid, effective, readily practiced, adapted to be used commercially, both in the manufacture of tubing and by the user, accurately locates defects of substantially any magnitude from the most minute to those of gross and microscopic character, and which eliminates the uncertainties of visual inspection to locate defects.

A further object of the invention is to provide a simple, relatively inexpensive, and effective apparatus for use in practicing the method provided by the invention, which does not require skilled operation, may be rendered fully automatic, and affords the degree of precision necessary according to the uses to which the article is to be put.

The invention may be described in connection with the accompanying drawings, which represent the invention as applied to the testing of tubing, and in which Fig. 1 is a longitudinal view, partly in section, through an apparatus embodying this invention, showing a tube in the act of being tested, together with a diagrammatic representation of suitable electrical testing accessory equipment; Figs. 2 and 2a views of a tube showing respectively the flow of induced current in a portion free from defects, and in a portion containing a defect; Figs. 2 to 5 longitudinal sectional views through modified forms of apparatus suitable for use in accordance with the invention; Fig. 6 a cross-sectional view of a further embodiment; and Fig. 7 a view similar to Figs. 3 to 5, showing still another form of apparatus.

The invention is predicated upon my discovery that defects in a metallic article may be located accurately by moving the article progressively through an induction, or exciting, field, to thereby induce flow of circulating currents in the article which set up a counter-magnetic field externally of the article and independent of the exciting field, and observing the character of flow of the circulating currents induced in the article, such flow and its resultant field being uniform in perfect regions, and irregularities in flow with consequent distortion of the countermagnetic field being caused by the presence of defects as they move through the induction, or exciting, field. The invention may be described more in detail with reference to the testing of tubing, to which it is especially applicable. In the preferred embodiment of the invention an alternating field, advantageously of substantially constant high frequency, is used as the exciting field, although as will be explained later a direct current field may be used.

As long as the tubing is perfect, i. e. free from defects, the induced currents flow in the tube in uniform or symmetrical paths, and they create a symmetrical counter-magnetic, field. To distinguish it from the primary induction field, that caused by the induced current may be referred to herein as the secondary, or induced, or counter-magnetic field. For example, in passing a metallic tube through a high frequency alternating induction field induced currents flow peripherally of the tube in a direction determined by the well known laws of induction. When, however, a defect, such as a slag inclusion, a fissure, segregation, or other inhomogeneity which varies the resistance of the tube, moves into the induction field, the induced currents are deflected, or distorted, from their normal path, so as to cause irregularities in the otherwise uniform flow, and consequently in the symmetry of the induced, or counter-magnetic, field. In accordance with this invention such irregularities in the otherwise uniform flow of induced current in the tube are applied to locate defects in the tube.

In the preferred practice of the invention the tube is moved relative to a high frequency exciting field generated concentrically of the tube, as by an induction coil arranged coaxially of the tube and connected to a suitable source of substantially constant high frequency current. Irregularities of current induced in the tube caused by defects present in the tube are detected by induction from the current flowing in the tube, as by means of a detector coil arranged symmetrically with respect to the induction coil and the tube and associated with a suitable means for electrically indicating the occurrence of unbalanced current flow conditions. Advantageously such detecting means takes the form of identical, or electrically equivalent, coils connected in opposition and having their terminals associated with a suitable means for indicating visually or audibly the disturbance in flow of induced current caused by a defect.

From what has been said it will be understood that as long as the tubing is free from defects the currents induced in the two detector coils will exactly neutralize each other, because the flow of induced current and the induced field are symmetrical, so that the indicating instrument will give a zero indication. When, however, a defect moves under the detector coil the flow of induced current is distorted from its normal path and the resultant distortion of the counter-magnetic field will cause the detector coils to become unbalanced to an extent depending upon the magnitude of the defect, which will in turn cause the indicating instrument to report such unbalanced condition.

The invention may be explained further with reference to the accompanying drawings. Having reference to the embodiment shown in Fig. 1, a tube 1 is passed over an induction coil 2 mounted upon a mandrel 3 carried in a yoke 4, or other suitable framework. Mandrel 3 is slidably mounted to permit adjustment of the longitudinal position of coil 2, and it may be clamped in adjusted position by means of a set screw 26. The terminals of coil 2 are connected by wires 5 and 6 to a suitable source of constant high frequency current, for example a 500-cycle generator 7.

Yoke 4 also carries a pair of coils 8 and 9 mounted side by side concentrically of the exterior of tube 1. These coils are identical, and they are connected by a lead 10 so that the voltages induced in them oppose one another. The terminals of these two coils are connected by leads 11 and 12 to a means for indicating the occurrence of a defect in the tube.

In the operation of this apparatus it is first necessary to adjust the position of coil 2 longitudinally so that detector coils 8 and 9 are exactly balanced when tubing free from defects is moved over the coils. This is done by moving mandrel 3 to shift coil 2 longitudinally so that its field is symmetrically positioned with regard to the two detector coils. This should be done with a piece of tubing known to be perfect in the position shown in Fig. 1. In other words, in the practice of this invention the detector coil is arranged to be electrically neutral with respect to the exciting field in regions of the article which are free from defects, and in the form of apparatus shown in Fig. 1 this is done by adjusting the exciting member relative to the detector coils so that the latter are threaded by equal amounts of exciting flux, whereby the E. M. F. generated in the detector coil 8 exactly balances that of coil 9. In this manner, the detector coils are likewise neutral with respect to the symmetrical counter-magnetic field in perfect regions of the tube.

The tube to be tested is now passed over the induction coil, thereby inducing flow of current in the tube. As indicated schematically by arrows in Fig. 2, these currents will flow in uniform symmetrical paths if the tubing is homogeneous and uniform. Under these conditions the currents induced in coils 8 and 9 are in balance. When, however, a defect such as a slag inclusion indicated schematically by the numeral 27, Figs. 1 and 2a, moves beneath the detector coil resistance of that portion of the tube will change, as compared with a perfect section, and the currents will tend to flow around the inclusion. As a result the paths of induced current flow will be distorted from the otherwise normal paths. For instance, the longitudinal defect 27 will cause the flow of current to be distorted around the ends of the defect, as indicated by the arrows in Fig. 2a. When the defect is unsymmetrically located with respect to coils 8 and 9 these coils will be affected to different extents, so that they no longer are in balance, and a potential will be set up in the circuit of leads 11 and 12. In other words, an indication will be given as the defect enters and leaves the coils. The terminals from the coils may be connected to a head phone apparatus, the occurrence of the customary clicks notifying the observer that a defect has entered the coil. Such a means of indicating the presence of defects does not give information as to their magnitude, and for this reason it is advantageous to amplify the detector coil current and use it with means for quantitatively measuring the indication created by the defect.

An amplifying system suitable for use in the practice of the invention is also shown in Fig. 1.

It comprises an amplifier tube 13 of conventional type, for receiving the current from the detector coils, through their terminal leads 11 and 12. A transformer 14 supplies current for filament excitation, and the plate is supplied with current from a battery 15. Any desired number of stages, or tubes 13, may be used to effect amplification. A single stage is shown for simplicity of illustration, although a three-stage amplifier has been found to be more suitable. The output from the amplifier is impressed upon a rectifier tube 16 from the output transformer 17 of the last stage of the amplifier.

A particular feature of this aspect of the invention resides in my discovery that especially desirable results attend the use of a grid bias on the rectifier tube, such as a source of adjustable potential 18. By altering the bias on the grid the sensitivity of the apparatus may be varied widely, as will be explained more fully hereinafter. Unidirectional current from rectifier 16, now suitably amplified, is applied through leads 19 and 20 to an appropriate electrical indicating instrument 21, a milliammeter being used advantageously for this purpose.

The output from the rectifier tube may be used also to operate an audible signalling device, by applying it to operate a sensitive relay 22, adapted to operate on minute currents, which in turn actuates a power relay 23 to ring an alarm bell 24. The power relay 23 may also be applied to actuate a device for marking the tubing approximately in the zone of the defect, for instance, a solenoid marker indicated schematically by the numeral 25, whose armature 25a is actuated to make a punch mark on the tubing when a defect moves through the coil. Where means such as solenoid marker 25 are used they should be magnetically shielded from the detector coils to eliminate regenerative chatter or like disturbances which might interfere with accurate operation. Also, the rectifier output may be used in connecting with a sorting device, to energize the device to automatically reject tubing containing defects, and to pass perfect tubing, or tubing of a predetermined standard of quality.

The extent of the indication given by indicating device 21 will depend upon the magnitude of the defect and its effect upon the tube, i. e. a slight defect causes a slightly unbalanced condition of the detector coils, while a defect of great magnitude causes a much larger potential to be generated in the detector coils, thus giving a larger deflection of the milliameter. This, then, affords means for determination of the relative magnitude of the defect.

Thus the invention provides a method and apparatus for accurately locating defects in tubing. By suitably adjusting the sensitivity of the device it can be made to indicate satisfactorily the most minute defect in the tube. For example, actual tests have shown that a substantial indication may be had from even a very faint prick punch indentation. That the apparatus will accurately indicate the magnitude of defects has been demonstrated also by milling a series of grooves of uniform width and of successively increasing the depth in a copper tube and testing it in the apparatus shown in Fig. 1. The successive grooves produced successively greater deflections of the milliameter. Similar indications will be given with defects other than discontinuities of the type just mentioned, for example non-metallic inclusions segregation and the like metallographic defects, folds in the metal, and the like.

For many purposes it will not be essential to locate extremely minute defects, it being necessary only to determine those which would render the tube unfit for its intended application, e. g. such as would cause failure under the pressure to which the tube is to be subjected. For such purposes the amplifier system can be adjusted to give an indication only with defects in excess of the critical size. Likewise, the relays actuating the bell, audible indicator, sorting or other device may be suitably adjusted to operate only under similar conditions. Such critical values may be determined readily by noting the magnitude of the current generated by a defect, cutting that portion of the tube out, and testing it by any appropriate mechanical means. This is repeated with defects of varying magnitude, until the critical values are found. The system may then be adjusted to indicate only defects which cause currents in excess of the critical value.

It is particularly to such adjustment of the sensitivity of the device that the application of voltage bias to the rectifier grid applies. By appropriately changing the bias voltage the sensitivity of the device can be altered to indicate extremely minute defects, or to indicate only defects in excess of some selected magnitude.

In commercial operation to locate defects only in excess of a particular degree of seriousness it will be desirable also to provide means for calibrating the device, so that the same response will always be had from defects of, for example, the same depth. This may be done appropriately by disconnecting leads 11 and 12 from coils 8 and 9 and impressing on the amplifier a known voltage, i. e. the voltage that has been predetermined as equivalent to the unbalance in the detector coil when a defect of the smallest magnitude that it is desirable to indicate passes under this coil, and adjusting the electrical conditions in the amplifying and indicating system to give the desired response. Thereupon the leads are again connected to the coils.

The particular conditions will vary according to the kind of tubing being tested, the nature and size of the defects to be located, and the like. That is, the size of the coils, the frequency used, etc. may be varied according to need, and this is fully within the skill of those familiar with the art. Low frequency current, e. g. 60-cycle, may be used but for most purposes more satisfactory results are had with high frequency current, and 500-cycle appears to be suitable for most purposes. For special purposes, however, higher or lower frequencies may be used, due regard being given to the tendency toward increasing skin effect which characterizes increase in frequency.

Instead of providing visual indicating means, such as a galvanometer or milliammeter, or audible indicating means, the output from the indicating system may be applied to a continuous recording device, such as those familiar in the art. These, for instance, trace a continuous graph to an appropriate scale, so that disturbances or irregularities in current flow in the tube are indicated upon and may be located directly from the graph.

The invention is not restricted to the use of an induction, or exciter, coil located in the tube, or to detector coils located externally of the tube. Both may be located interiorly or exteriorly of the tube. An apparatus having both exciter and detector coils mounted exteriorly of the tube is shown in Fig. 3, in which tube 1a is moved through an induction coil 2a surrounding the tube and connected by leads 5a and 6a to a suitable source of high frequency current. Mounted concentrically within coil 2a are the detector coils 8a and 9a, these being connected in opposition, as in the preceding embodiment, by means of a lead 10a, and being connected to an amplifier system by leads 11a and 12a. Adjustment of the induction coil with respect to the detector coils may be effected in any desired manner.

Fig. 4 represents a modified form of the apparatus shown in Fig. 1. The tube 1b which is to be tested moves over an induction coil 2b, and surrounding the tube is a single detector coil 28. A tube 29 similar to tube 1b, but known to be perfect, is placed over an induction coil 30 identical with coil 2b, and through a detector coil 28a identical with coil 28. Induction coils 2b and 30 are connected to a high frequency source. Coils 28 and 28a are connected to oppose each other by a lead 31, and their terminals are connected by leads 32 and 33 to an amplifier system, such as that described hereinabove. In the use of this form of apparatus coils 28 and 28a will exactly neutralize each other, being exact duplicates, as long as the tube being tested (1b) is identical with the standard of comparison, i. e. tube 29. When, however, tube 1b differs from tube 29, for example through the occurrence of a defect, a voltage will be induced through unbalancing of the detector coils, which will be indicated as described previously.

Such an embodiment of the invention is applicable also to detecting differences in conductivity due to variations in wall thickness, as compared with a standard tube. For instance, in the modification just described tube 29 having a standard wall thickness may be taken as a standard for checking the thickness of a series of tubes 1b. As long as the wall thickness of tube 1b is the same as that of tube 29 the detecting coils will cause no deflection of the indicating instrument. If tube 1b has a wall thickness either greater or smaller than that of tube 29 the detecting coils will indicate such variation, as in the case of a defect, because of differences in conductivity. In this way the device shown in Fig. 4 may be used both to locate defects and also to check wall thickness of the tubing.

The unbalanced condition due to defects in the tubing has been described as applied to measuring the magnitude of the voltage caused by a defect as it moves past the detector coil. The occurrence of a defect may cause other variations in the voltage, however. The voltage of the two detector coils shown in Figs. 1 to 4 can be neutralized only when the complete wave from each coil is identical in all respects, i. e. equal in magnitude and shape, and when they are exactly opposite in phase. Hence when the coils are unbalanced one or more of these factors is disturbed, so that in addition to magnitude of voltage effect the phase angle shifts or the wave shape changes, as compared with those of the induction coil, and these may be used to indicate defects, instead of the voltage difference described previously. Such changes in wave shape and in phase angle may be determined according to means known to those skilled in the art.

Other forms of apparatus are equally applicable to the practice of the invention. One such embodiment is shown in Fig. 5, in which the tube 1c is moved through an exciting coil 35 which produces a field at right angles to the axis of the tube, as indicated by the solid line arrow. As long as this field is undistorted by the occurrence of defects in the tube the single detector coil 36 will not generate any voltage. A defect in the tube, however, will result in distortion of the field, one path of which is shown by the broken line arrow, and this will cause a certain amount of the flux to link the detector coil and thereby generate a voltage which is transmitted by detector coil terminal leads 37 and 38 to the amplifier system.

The apparatus shown in Fig. 5 is applicable only to the detection of defects occurring directly under exciting coil 35, since defects midway therebetween will not deflect the field set up by them. To overcome this disadvantage the tube may be rotated as it moves through the coils, or there may be used the apparatus shown in Fig. 6, in which paired exciting coils 39 and 40 are mounted as shown around the tube 1d, which is also surrounded by a single detector coil 41, as in Fig. 5. Coils 39 and 40 may be disposed in the same plane and energized from a two-phase current, coil 39 being connected to one, and coil 40 to the other, phase. This produces a rotating field which effectively is like rotating the tube in the apparatus of Fig. 5. Or, coils 39 and 40 may be spaced longitudinally, although offset as shown, each being provided with a detector coil.

Still another apparatus that may be used is shown in Fig. 7. Spaced induction coils 42 and 43 encircle the tube and equidistant from a detector coil 44 connected by leads 45 and 46 to a suitable indicating system. Induction coils 42 and 43 are connected by a lead 47 so that their fields oppose each other, as indicated by the arrows. This results in the field passing through detector coil 44 in such manner that no voltage is induced therein as long as the tube is free from defects. The occurrence of a defect in the tubing within the field of influence of the coils disturbs the symmetry of the field and causes a current to flow in the circuit including leads 45 and 46, giving an indication as described hereinabove.

In all of the foregoing forms of apparatus the detector element is located to be electrically neutral with respect to the exciting and countermagnetic fields in regions free from defects as described in connection with Fig. 1. In the case of an apparatus such as shown in Fig. 7, this is preferably done by adjusting the single detector coil relative to the exciting coils, so that the detector coil is threaded by equal amounts of flux from each of the exciting coils, whereby no voltage is generated in regions free from defects.

The embodiments shown in Figs. 5 to 7 are adapted for use primarily in determining the magnitude of change in voltage due to the occurrence of a defect, and not to measuring change in wave shape or phase angle, while all three effects may be used, with apparatus such as shown in Figs. 1 to 4.

For some purposes apparatus such as shown in Figs. 1 and 4 may be most suitable, because the tube interposed between the exciter and detector coils acts to shield the latter from the strong field of the exciting coil. Of course, if desirable, the coils in other types of apparatus may be shielded appropriately.

For rapidity in testing apparatus of the types shown in Figs. 3 and 5 to 7 may be desirable, as these dispense with interior mandrels and permit the tubes to be passed continuously through the testing device. The advantages of shielding may be obtained with apparatus other than those shown, for instance by using two opposed induction coils, carried by an inner mandrel, instead of coil 2, Fig. 1, and using a single detector coil surrounding the tube at a point intermediate and symmetrically positioned with respect to the two exciting coils. In this embodiment the advantages of the apparatus shown in Fig. 7 are combined with the shielding effected by the tube.

Moreover, direct current induction may be used, in which case a momentary indication will be given by defects.

That the invention accurately locates such defects has been indicated hereinabove. This has also been shown by testing tubing in an apparatus similar to that shown in Fig. 1, and marking the tube upon the occurrence of a defect. A length of the tube containing such defect was then subjected to internal hydrostatic pressure, which caused the tube to burst exactly at the point indicated by the practice of the invention. In this case the defects were totally unobservable by the naked eye.

The invention thus provides for the simple and accurate detection of various types of defects in metallic tubing. It is applicable to the detection of such defects either as a step in the production of the tube, or by the user thereof. Thus, the tubing as it comes from the drawing operation may be moved mechanically through an apparatus such as those described hereinabove, whereby tubing containing defects of the critical magnitude may be removed, and thus the expense of further operations, or shipment to the place of use, may be obviated. Or, the user of the tubing may apply the invention to check the value of the tube for his particular use. The advantage of marking the tubing in some manner, as indicated hereinabove, is that the faulty section of the tube may be cut out, if desired. Thus there is avoided the expense of operating on faulty tubes, as well as minimizing the danger of having such parts fail in service. Other advantages of the invention will be understood by those skilled in the art.

According to the provisions of the Patent Statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. The method of locating defects in a metallic non-magnetic article comprising progressively moving the article relative to a substantially constant alternating exciting field to induce in the article circulating currents which create a counter-magnetic field external to the article, the flow of said circulating currents and said counter-magnetic field being substantially uniform in regions free from defects and being distorted by a defect as it moves through said exciting field, applying said counter-magnetic field to an induction coil arranged to be electrically substantially neutral in regions free from defects and to be electrically unbalanced by said distortion of said counter-magnetic field, and electrically measuring unbalancing of said coil by said distortion.

2. The method of locating defects in a metallic non-magnetic article comprising progressively moving the article relative to a substantially constant alternating exciting field and thereby inducing in the article circulating currents which flow in a direction transverse to the prevailing direction of defects and which create a counter-magnetic field external to the article, applying said counter-magnetic field to induce opposed detecting currents, the flow of said circulating currents and said counter-magnetic field being substantialy uniform in regions free from defects and causing said detecting currents to be substantially balanced, and said flow of circulating currents and counter-magnetic field being distorted by a defect as it moves through the exciting field whereby said detecting currents become unbalanced, and detecting the occurrence of a defect by measuring the E. M. F. caused by unbalancing of said opposed detecting currents due to a defect, the magnitude of the E. M. F. indicating the severity of the defect.

3. The method of locating defects in a metallic non-magnetic article, comprising progressively moving the article relative to a substantially constant alternating exciting field arranged on one side of the article and thereby inducing in the article circulating currents flowing in a direction normal to the prevailing direction of defects and which create a counter-magnetic field external to the article, said counter-magnetic field being symmetrical in regions of the article free from defects and being distorted by a defect as it moves through said exciting field, applying said counter-magnetic field to an induction coil disposed on the side of the article opposite said exciting field and arranged to be electrically substantially neutral in regions free from defects and to become unbalanced by said distortion of said counter-magnetic field, and measuring the E. M. F. due to unbalancing of said coil by a defect.

4. The method of locating defects in a metallic non-magnetic tube, rod or the like comprising progressively moving the tube through a pair of substantially identical induction coils connected in opposition to a substantially constant alternating current source to induce in the tube circulating currents which create a counter-magnetic field external to the article, the flow of said circulating currents and said counter-magnetic field being substantially uniform in regions of the tube free from defects and being distorted by a defect as it moves through said exciting field, applying said counter-magnetic field to a detector coil surrounding the tube intermediate said induction coils and positioned to be electrically neutral in regions free from defects and electrically measuring unbalancing of said detector coil caused by distortion of said counter-magnetic field by a defect.

5. An apparatus for locating defects in a metallic non-magnetic article, comprising an induction coil arranged for passage through its field of the article to be tested, said coil being adapted for connection to a source of substantially constant alternating current, a detector coil arranged in the field of said induction coil and in the counter-magnetic field set up externally of the article by the circulating currents induced in the article by said induction coil to be electrically neutral in regions free from defects, and electrical means connected to said detector coil for indicating electrical unbalancing thereof due to the distorted portion of said counter-magnetic field caused by a defect as the defect moves through the exciting field of said induction coil.

6. An apparatus for locating defects in metallic non-magnetic tubing comprising an exciting coil member arranged for passage concentrically through its field of the tube to be tested, said coil being adapted for connection to a source of substantially constant current, exposure of the tubing to said field causing circulating currents to be set up in the tubing creative of a counter-magnetic field external to the coil which is symmetrical in regions free from defects, a detector member comprising a pair of electrically identical coils connected in opposition and arranged symmetrically in the exciting and counter-magnetic fields, and electrical indicating means operatively connected to said detector coils for actuation thereby, said currents induced in said detector coils neutralizing each other in regions free from defects, and the occurrence of a defect causing distortion of said counter-magnetic field and thereby causing said detector coils to become unbalanced and create a voltage which actuates said indicating means to show the presence of the defect, and means associated with one of said members for adjusting it relative to the other member for electrically centering the detector coils to be neutral in regions free from defects.

7. An apparatus as claimed in claim 6, and means electrically connected to said detector coils for amplifying and rectifying the signal voltage due to unbalancing of said detector coils.

8. An apparatus for locating defects in a metallic article, comprising an induction coil arranged for passage through its field of the article to be tested, said coil being adapted for connection to a source of substantially constant alternating current, a detector coil arranged in the field of said induction coil and in the counter-magnetic field set up by the circulating currents induced in the article by said induction coil and arranged to be electrically neutral in regions free from defects and electrical means connected to said detector coil for indicating electrical unbalancing thereof due to the distorted portion of said counter-magnetic field caused by a defect in the metallic article as such defect moves through the external field of said induction coil.

9. The method of locating defects in a metallic article comprising progressively moving the article relative to a substantially constant alternating exciting field to induce in the article circulating currents which create a counter-magnetic field external to the article, the flow of said circulating currents and said counter-magnetic field being substantially uniform in regions of the article free from defects and being distorted by a defect in the article as it moves through said exciting field, applying said counter-magnetic field to a detecting coil arranged to be electrically substantial neutral in regions of said article free from defects and to be electrically unbalanced by said distortion of said counter-magnetic field, and electrically measuring the unbalancing of said detecting coil by said distortion.

ARCHIBALD H. DAVIS, Jr.